US011544333B2

(12) United States Patent
Rawal et al.

(10) Patent No.: US 11,544,333 B2
(45) Date of Patent: Jan. 3, 2023

(54) ANALYTICS SYSTEM ONBOARDING OF WEB CONTENT

(71) Applicant: Adobe Inc., San Jose, CA (US)

(72) Inventors: Deepansh Rawal, Noida (IN); Shubhi Rastogi, Noida (IN); Shivani Jaiswal, Sitapur (IN); Saurabh Garg, New Delhi (IN); Hyder Javeed Ziaee, Hyderabad (IN); Deepak Kumar, Ludhiana (IN); Akshay Sethi, Vijay Nagar (IN); Aditi Jain, Jaipur (IN)

(73) Assignee: Adobe Inc., San Jose, CA (US)

( * ) Notice: Subject to any disclaimer, the term of this patent is extended or adjusted under 35 U.S.C. 154(b) by 454 days.

(21) Appl. No.: 16/551,395

(22) Filed: Aug. 26, 2019

(65) Prior Publication Data

US 2021/0064676 A1    Mar. 4, 2021

(51) Int. Cl.
```
G06F 16/95       (2019.01)
G06F 16/9532     (2019.01)
G06F 16/957      (2019.01)
G06N 20/00       (2019.01)
G06F 16/958      (2019.01)
G06V 30/262      (2022.01)
H04L 67/50       (2022.01)
```

(52) U.S. Cl.
CPC ...... *G06F 16/9532* (2019.01); *G06F 16/9574* (2019.01); *G06F 16/9577* (2019.01); *G06F 16/972* (2019.01); *G06N 20/00* (2019.01); *G06V 30/274* (2022.01); *H04L 67/535* (2022.05)

(58) Field of Classification Search
CPC .................................................. G06F 16/9532
See application file for complete search history.

(56) References Cited

U.S. PATENT DOCUMENTS

| | | | |
|---|---|---|---|
| 10,614,345 B1 * | 4/2020 | Tecuci ................. | G06K 9/6272 |
| 10,922,493 B1 * | 2/2021 | Das ........................ | G06F 16/243 |
| 11,288,319 B1 * | 3/2022 | Das ........................ | G06F 40/284 |
| 2016/0162473 A1 * | 6/2016 | Cogley ................... | G06F 40/51 |
| | | | 704/9 |
| 2016/0300144 A1 * | 10/2016 | Santhanam ........ | G06Q 30/0631 |
| 2017/0243234 A1 * | 8/2017 | Bajaj ................. | G06Q 30/0201 |
| 2018/0083898 A1 * | 3/2018 | Pham .................. | G06F 3/04842 |
| 2018/0189692 A1 * | 7/2018 | Newhouse ............. | G06F 16/25 |
| 2018/0189706 A1 * | 7/2018 | Newhouse ........... | G06Q 10/101 |
| 2018/0300315 A1 * | 10/2018 | Leal ...................... | G06F 16/355 |
| 2020/0073983 A1 * | 3/2020 | Sen ....................... | G06F 16/243 |
| 2020/0402015 A1 * | 12/2020 | Ozcaglar ............... | G06N 20/00 |
| 2020/0410157 A1 * | 12/2020 | van de Kerkhof ... | G06F 40/166 |

* cited by examiner

*Primary Examiner* — Mohammad S Rostami
(74) *Attorney, Agent, or Firm* — FIG. 1 Patents

(57) ABSTRACT

Analytics system onboarding of web content is described. In one example, an analytics onboarding system is configured to process web content to generate recommendations, automatically and without user intervention. The recommendations are configured to assist in mapping of web content variables in web content to data elements supported by an analytics system to generate metrics that describe occurrence of events as part of user interaction with web content.

20 Claims, 8 Drawing Sheets

700

510
Determine, using machine learning, semantic similarity of the web content variable with respect to a list of data elements, the data elements involving metrics supported by an analytics system to track web content user interaction

702
Generate a semantic representation of the web content variable

704
Generate a similarity score for the semantic representation with respect to semantic representations of data elements in the list of data elements

*Fig. 7*

ANALYTICS SYSTEM ONBOARDING OF WEB CONTENT

BACKGROUND

Analytics systems have been developed to generate insights regarding user interaction with web content. These insights may be leveraged for a variety of purposes, such as to control operation of computing devices that implement the web content (e.g., load balancing and resource provisioning), control output of digital content by the computing devices (e.g., recommendations, digital marketing content), and so forth.

To do so, petabytes of data may be generated that describe a wide variety of aspects of this user interaction, which are referred to as data elements. Examples include characteristics of the content, characteristics of the user that interacts with the content, a device used by the user, characteristics of a physical environment in which the device is disposed, temporal characteristics, and so on. The data may then be leveraged to support a variety of metrics, such as percentage of users at a particular location consume web content and any actions that may results from that consumption, e.g., conversion of a good or service.

Conventional techniques used to "onboard" web content to support operations with the analytics systems (e.g., to generate analytics data processed by the analytics systems) are time and resource intensive. For example, onboarding of web content by conventional analytics systems typically takes half a year and use of sophisticated data scientists thereby limiting availability of these techniques. This may be caused by the complexity of the web content as well as a vast amount of web content that is to be onboarded for use with the analytics system, even from a single website. Consequently, this results in an inefficient use of human resources (e.g., the data scientists tasked with manually onboarding web content) as well as computational resources employed by the data scientists.

SUMMARY

Techniques and systems are described for analytics system onboarding of web content. In one example, an analytics onboarding system is configured to process web content to generate recommendations, automatically and without user intervention. The recommendations are configured to assist in mapping of web content variables in web content to data elements supported by an analytics system to generate metrics that describe occurrence of events as part of user interaction with web content.

The recommendations are generated using semantic analysis through comparison of semantic representations (e.g., vectors) of the web content variables that are generated using machine learning with semantic representations of the data elements. Similarity of the semantic representations (e.g., Cosine similarity of the vectors) is used to generate the recommendations, e.g., based on similarity scores to form a recommendation of data elements that are determined to be the most similar to the web content variable. In this way, differences in web content variables, such as how functionality of those variables is described in text of the web content, may be readily mapped to data elements of the analytics system. As a result, the techniques described herein may improve efficiency of onboarding of web content from the months of conventional techniques to a few hours.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 is a flow diagram depicting a procedure in an example implementation of determining semantic similarity, using machine learning, of the web content variable to data elements supported by the analytics system as a basis to generate the recommendation.

DETAILED DESCRIPTION

Overview

Figure 1:
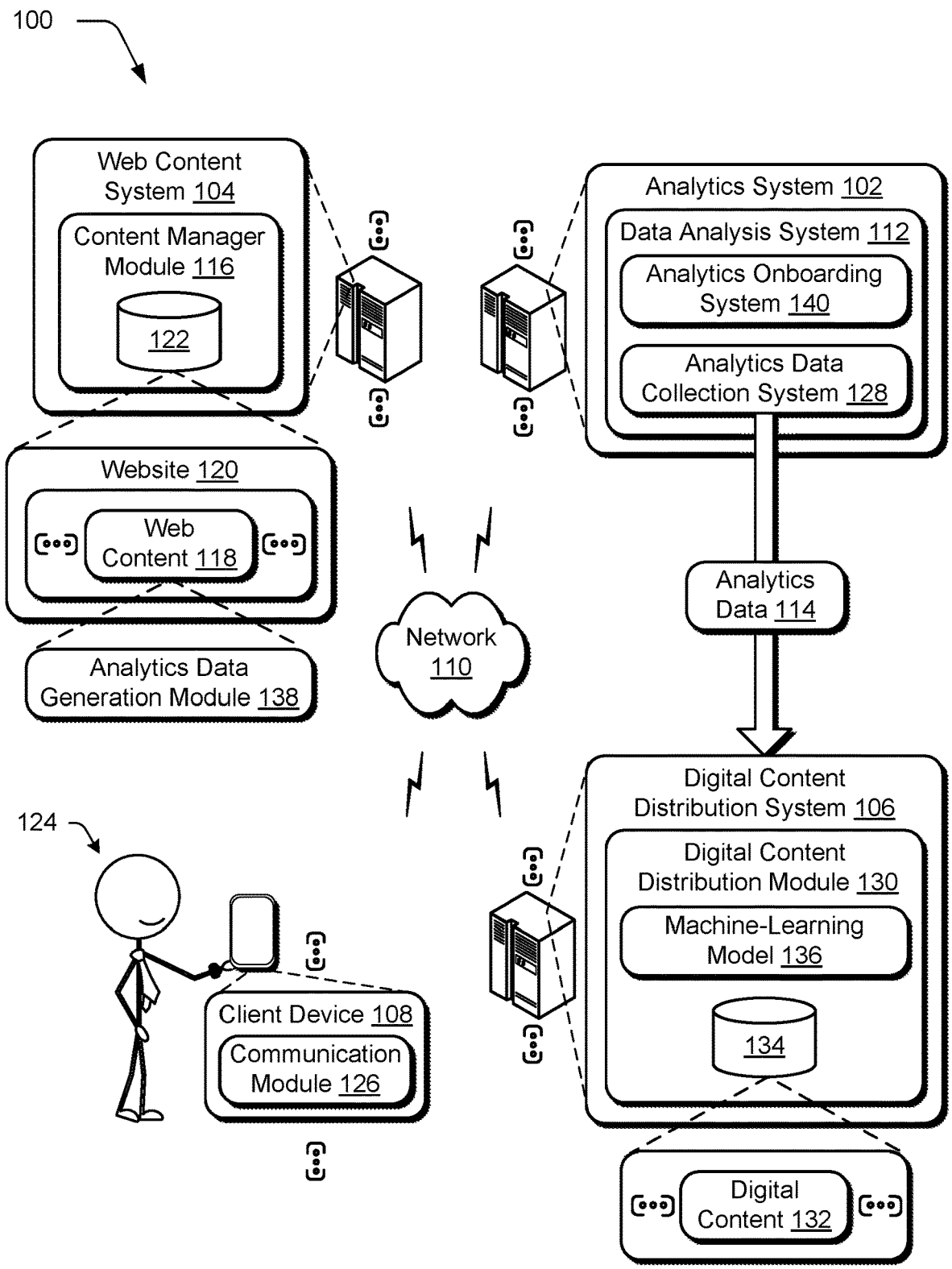
FIG. 1 is an illustration of an environment in an example implementation that is operable to employ analytics system web content onboarding techniques described herein.

Analytics systems are tasked with generating insights from vast amounts of data. A service provider system, for instance, may generate petabytes of data that describes interaction of millions of users with thousands and even tens of thousands of webpages as part of a website. The analytics system may then support a variety of functionality based on analysis of this data as described above, such as to control operation of computing devices that implement the web content, control content output by the computing devices, and so forth. However, conventional techniques used to onboard web content for use with the analytics system are time and resource intensive, e.g., typically involves half a year of work by sophisticated data scientists to achieve for a single website. Consequently, the resource requirements involved in conventional onboarding techniques limit availability of these techniques and the insights and functionality that may be gained and supported through use of analytics systems.

Accordingly, techniques and systems are described for analytics system onboarding of web content. In one example, an analytics onboarding system is configured to process web content to generate recommendations, automatically and without user intervention. The recommendations are configured to assist in mapping of web content variables in the web content to data elements supported by an analytics system to generate metrics that describe occurrence of events as part of user interaction with web content.

Events are actions taken by users as part of interaction with web content (e.g., webpages of a website). For an ecommerce website, for instance, actions may include adding an item to a shopping cart, applying a coupon, use of "buy now," removing an item from the shopping cart, and so forth. For web content dissemination systems (e.g., music and/or video streaming services), actions may include initiating streaming of web content, web content searches, and so on.

Data elements are variables supported by the analytics system that are tracked for each event, e.g., to generate metrics regarding the event. Continuing with the shopping cart example above, data elements may include a seller's name, product name, product ID, price, delivery time, product characteristics, user demographics, and so forth. Metrics are generated by the analytics system based on these data elements, such as an average cost per product sold in a particular hour, computational resources utilized over a holiday weekend, and so forth. The metrics may then be used to control operation of computing devices that implement the web content, control dissemination of web content, and so forth. Similar data elements and metrics may be used to track actions for web content dissemination systems and other types of service provider systems that make web content available to client devices via a network.

In order to generate the recommendations, in one example, the analytics onboarding system outputs a user interface, via which, a user input is received that identifies a network address (e.g., URL) of web content to be onboarded and a type of domain of the web content, e.g., ecommerce, music streaming, video streaming, news, storage, etc. Based on the user input, the analytics onboarding system obtains the web content from the corresponding network address. A list is also obtained. The list in this example is a domain-specific template that specifies data elements supported by the analytics system for that type of domain, e.g., commerce data elements for ecommerce, streaming data elements for music and streaming services, and so forth. Other examples of domains include automotive, education, financial services, healthcare, manufacturing and distribution, media and entertainment, telecom, and travel and hospitality. In this way, the analytics onboarding system may adapt to particular types of domains in an efficient manner and avoid processing of data elements that may not be relevant to that type of domain (e.g., streaming metrics for a non-streaming domain) and thus improve efficiency and usage of computational resources. Other examples are also contemplated including use of a generalized list that is not particular to a type of domain.

Once the web content is obtained, automatically, by the analytics onboarding system, the analytics onboarding system generates a recommendation, also automatically and without user intervention, to map variables included in the web content to data elements in the list. To do so, the analytics onboarding system selects candidate web content variables from source code of the web content that are relevant to analytics data generation, e.g., object oriented computing language variables (e.g., JavaScript® variables), hypertext markup language (HTML) metatags, input tags, div text or div IDs (e.g., defining a division or section in an HTML document), cascading style sheet (CSS) selectors, and so forth. The rest of the source code is then discarded by the system in this example.

Next, the analytics onboarding system prunes the selected candidate web content variables based on one or more defined characteristics, e.g., by removing words over 100 characters, removing container structures (e.g., JSON structures) by flattening the containers to obtain the variables contained therein, and so forth.

After pruning, the analytics onboarding system converts the candidate web content variables for consistency to each other, semantically, using semantic analysis. The analytics onboarding system, for instance, may be configured to follow one or more semantic conventions involving use of underscores, hyphens, camel cases (e.g., use of an initial capital for the first letter of a word forming a second element of a closed compound such as InDesign®), and so forth. A web content variable is then selected from the candidate web content variables to determine which data element supported by the analytics system corresponds to the web content variable.

To do so, the analytics onboarding system determines semantic similarity of the web content variable to respective data elements in the list, automatically and without user intervention, using machine learning. The analytics onboarding system, for instance, may generate a semantic representation of the web content variable using a model trained using machine learning. The model, for instance, may be implemented as a neural network that is trained using a text corpus to output vectors that represent the text in a vector space. Nearness of vectors to each other (i.e., a distance between) in the vector space defines an amount of semantic similarity of the vectors to each other. An example of such a model is known as "Word2vec", however other types of models are also contemplated.

Therefore, the semantic representation generated for the web content variable is compared to semantic representations generated using the model for the data elements. Similarity scores are then generated by the analytics onboarding system as a result of this comparison, e.g., through use of Cosine similarity of the vectors within the vector space. The similarity scores are used as a basis to generate the recommendation, e.g., by selecting a threshold number of data elements that are the closest, data elements having a similarity score over a threshold amount, and so on.

Once generated, the recommendation is employed by the analytics onboarding system to determine correspondence of the web content variable with a corresponding data element. This may be performed in a variety of ways. In one example, a representation of the web content variable is output in a user interface with representations of a plurality of data elements specified in the recommendation. A user input may then be received via the user interface selecting which of the data elements represented in the user interface correspond to the web content variable, e.g., via a cursor control device, gesture, utterance, and so forth. In another example, the data element is selected automatically and without user intervention that has the highest similarity score, is above a threshold amount, and so on. Other examples are also contemplated. In this way, the web content variable may be mapped to the data element.

The mapping of the web content variable, once performed for each of the candidate web content variables selected above from the web content, may then be used to support a variety of functionality. In one example, an analytics data generation module is generated that is configured to be embedded as part of the web content to report analytics data to the analytics system for processing. The mapping, for instance, may be employed by the analytics onboarding system along with rules specified by the domain-specific template to define how analytics data generated as part of monitored user interaction with the web content is communicated to corresponding application programming interfaces (APIs) of the analytics system by the analytics data generation module.

The analytics data generation module, for instance, may be configured as a "tag" or "pixel" as a snippet of executable code (e.g., JavaScript) that collects and communicates analytics data to the analytics system. The analytics data generation module once embedded as part of the web content, may be used to implement a variety of functionality. Examples of this functionality include control output of digital content (e.g., advertisements) in conjunction with the web content, control operation of computational resources used to provide the web content (e.g., computational and network resource provisioning), and other functionality.

In this way, the analytics system onboarding techniques and systems described herein overcome the challenges of conventional techniques, such as to reduce an amount of time taken to onboard a website from several months to several hours. This also results in a corresponding reduction in computation resource consumption realized by the efficiency of these techniques. Further discussion of these and other examples is included in the following sections.

Terms

"Web content" as used herein describes any sort of content that is capable of being accessed over and/or communicated via a network. Examples of web content include web pages, screens of a user interface, digital images, digital movies, digital audio, and so forth.

"Web content variables" are variables included in web content that are usable to describe characteristics of the web content, user interaction with the web content, computing devices used to implement the web content, and so on. Examples of web content variables include object-oriented computing language variables (e.g., JavaScript® variables), hypertext markup language (HTML) metatags, input tags, div text or div IDs (e.g., defining a division or section in an HTML document), cascading style sheet (CSS) selectors, and so forth.

"Events" are actions taken by users as part of interaction with web content (e.g., webpages of a website). For an ecommerce website, for instance, actions may include adding an item to a shopping cart, applying a coupon, use of "buy now," removing an item from the shopping cart, and so forth. For web content dissemination systems (e.g., music and/or video streaming services), actions may include initiating streaming of web content, web content searches, and so on.

"Data elements" are variables supported by the analytics system that are tracked for each event, e.g., to generate metrics regarding the event. For a shopping cart example, data elements may include a seller's name, product name, product ID, price, delivery time, product characteristics, user demographics, and so forth.

"Metrics" are generated based on these data elements, such as an average cost per product sold in a particular hour, computational resources utilized over a holiday weekend, and so forth. Metrics may be used to control operation of computing devices that implement the web content, control dissemination of web content, and so forth.

An "analytics data generation module" is executable code that is embeddable as part of web content to output analytics data. Examples of analytics data generation modules include a "tag" or "pixel" as a snippet of executable code (e.g., JavaScript) that collects and communicates analytics data to an analytics system.

"Semantic similarity" as determined using machine learning refers to use of a machine-learning model to generate semantic representations (e.g., vectors) of text that are comparable to each other within a vector space to determine similarity of concepts expressed by the semantic representations to each other. A machine-learning model, for instance, may be trained using a corpus of text to reconstruct linguistic context of text included in the corpus. A vector space generated as part of this training and implemented by the machine-learning model may then be used to determine semantic similarity of concepts reflected by vectors generated by the machine-learning model. An example of machine-learning models trained to generate vectors and implement such a vector space is referred to as "word2vec" which is a group of related models implemented as two-layer neural networks. Other examples are also contemplated.

"Cosine similarity" measures a cosine of an angle between two non-zero vectors of an inner product space (i.e., the vector space) implemented by the machine-learning model above. Closeness of the vectors within this vector space (e.g., based on the angle) specifies an amount of similarity of the vectors, and therefore the corresponding semantic representations to each other. Thus, the similarity score based on this angle (and thus an amount of "closeness" within the vector space) defines an amount of similarity of the semantic representations.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ analytics system onboarding of web content techniques described herein. The illustrated environment 100 includes an analytics system 102, a web content system 104, a digital content distribution system 106, and a client device 108 that are communicatively coupled, one to another, via a network 110, e.g., the Internet. Computing devices that implement these systems and device may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 8.

The analytics system 102 includes a data analysis system 112 that is configured to collect, analyze, mange, and expose of a result of processing analytics data 114. The data analysis system 112, for instance, is configured to identify meaningful patterns in the analytics data 114 using machine learning and use those patterns to implement a variety of functionality. Example of this functionality include to control operation of computing devices, dissemination of digital content, and so forth.

In the illustrated example, for instance, a web content system 104 includes a content manager module 116 that is configured to manage output of web content 118 via a network 110 (e.g., as part of a website 120 accessible via a URL), which is illustrated as stored in a storage device 122. The web content 118 in this example is configured as webpages, however a variety of other examples are also contemplated, such as digital audio, digital images, digital movies, and other content that may be accessed and communicated via a network 110. A user 124 of a client device 108, for instance, may interact with a communication module 126 (e.g., a browser, network-enabled application, and so on) to access the web content 118 of the website 120 via the network 110. An analytics data collection system 128 of the analytics system 102 is configured to collect analytics data 114 that describes this user interaction. The analytics data 114, for instance, may describe characteristics of the user 124 (e.g., demographic information such as age, gender, nationality, geographic location), hardware and/or software characteristics of the client device 108 and/or communication module 126, characteristics regarding when and where this interaction occurred, characteristics of the web content 118, website 120, and or web content system 104, the network 110, and so forth.

The analytics data 114 collected by the analytics system 102 may be leveraged to implement a variety of functionality. In the illustrated example, the analytics data 114 is communicated to a digital content distribution system 106. The digital content distribution system 106 includes a digital content distribution module 130 that is configured to control distribution of digital content 132 (illustrated as stored in a storage device 134) for output concurrently with the web content 118 to the user 124 of the client device 108. The digital content 132, for instance, may be configured as digital marketing content such as a banner ad, digital video, digital audio, digital image, and so forth that is output with the web content 118 to cause conversion of a good or service.

In order to determine which item of digital content 132 is to be output, the digital content distribution module 130 employs a machine-learning model 136 that is trained using machine learning to select the item of digital content 132 based on processing of the analytics data 114. The machine-learning model 136 may be configured in a variety of ways, such as a neural network (e.g., a deep-learning neural network), statistical model (e.g., using linear regression) and so forth. The machine-learning model 136 is trained using training data to identify patterns that are not recognizable by a human in order to determine which item of digital content 132 has a greatest likelihood in causing performance of a desired action, e.g., conversion in this example. Other examples are also contemplated, such as to control operation of computing devices that implement the web content system 104 (e.g., load balancing and provisioning), digital content distribution system 106, the client device 108, and so forth.

In order to generate the analytics data 114, the analytics system 102 is configured to generate an analytics data generation module 138 that is embedded as part of the web content 118. The analytics data generation module 138, once embedded, generates the analytics data 114 and sends this data to respective application programming interfaces (APIs) of the analytics data collection system 128 via the network 110.

The analytics data generation module 138, for instance, may be configured as executable code such as a "tag" or "pixel" as a snippet of executable code (e.g., JavaScript) that collects and communicates analytics data 114 to the analytics data collection system 128. In this way, the analytics data 114 may be collected that describes a multitude of user interactions accomplished via client device 108 with web content 118 to implement and support a variety of functionality.

As previously described, however, conventional techniques used to "onboard" the web content 118 such that operation of the web content 118 is compatible with generating the analytics data 114 are time, labor, and computationally expensive and resource intensive. Accordingly, in the techniques described herein an analytics onboarding system 140 is described that improves efficiency in onboarding the web content 118 to work with the analytics system 102, which has shown improvements from the half a year as typically involved with conventional techniques to a few hours using the techniques described herein.

The analytics onboarding system 140, for instance, may be configured to assist in mapping data elements supported by metrics of the analytics system 102 to web content variables included in the web content 118. As part of this, the analytics onboarding system 140 generates recommendations for the mapping based on a semantic analysis of web content variables of the web content 118 and the data elements supported by the analytics data collection system 128.

The analytics onboarding system 140, for instance, may generate semantic representations of the web content variables of the web content 118 and data elements supported by the analytics system 102 using a model trained using machine learning, e.g., as vectors. Nearness of vectors to each other (i.e., a distance between) in a vector space implemented by the model defines an amount of semantic similarity of the vectors to each other. This "nearness," for instance, may be defined through use of similarity scores, e.g., through use of Cosine similarity of the vectors within the vector space by the analytics onboarding system 140. The similarity scores are used by the analytics onboarding system 140 as a basis to generate the recommendation, e.g., by selecting a threshold number of data elements that are the closest in the vector space, data elements having a similarity score over a threshold amount, and so on.

Once generated, the recommendation is employed by the analytics onboarding system 140 to determine correspondence of the web content variable with a corresponding data element, i.e., to map web content variables to data elements. In one example, representations of the web content variables are output in a user interface along with representations of a plurality of data elements specified in the recommendation, e.g., the semantically close data elements. User inputs are then received via the user interface to select which data elements correspond to which web content variables. Other examples are also contemplated in which this correspondence is determined automatically and without user intervention by the analytics onboarding system 140, e.g., the data element is selected that has the highest similarity score, is above a threshold amount, and so forth by the system.

The analytics data generation module 138 is then generated by the analytics onboarding system 140 based on this mapping and embedded as part of the web content 118. The analytics onboarding system 140, for instance, may generate the analytics data generation module 138 as executable code for embedding as part of the web content 118. Once embedded, the analytics data generation module 138 is configured to communicate data generated based on respective web content variables in the web content 118 to corresponding data elements via respective APIs of the analytics data collection system 128. In this way, the analytics onboarding system 140 overcomes the inefficiencies and challenges of conventional onboarding techniques that required months to be performed by sophisticated data scientists, further discussion of which is included in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Web Content Onboarding for Operation with an Analytics System

Figure 2:
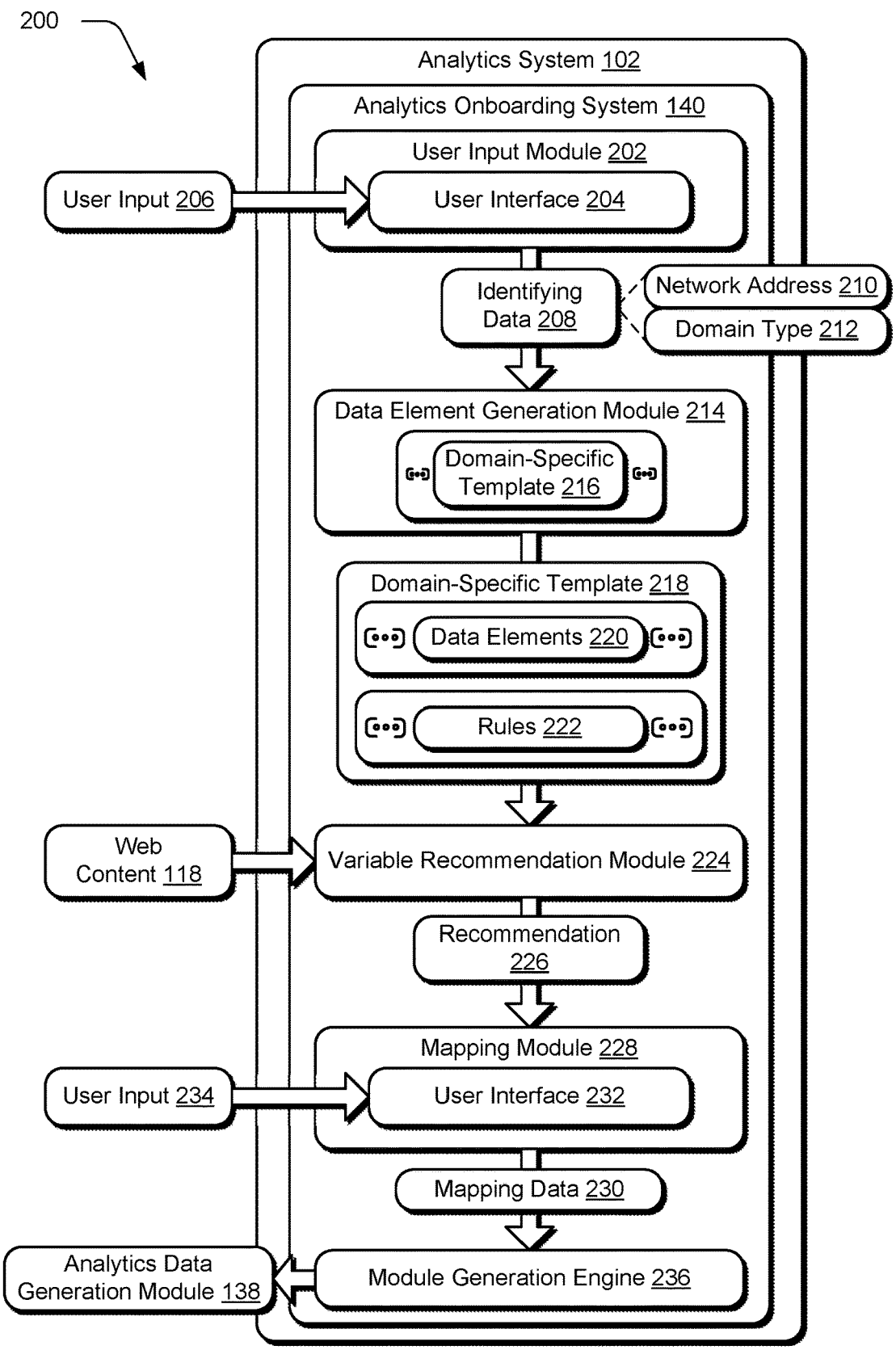
FIG. 2 depicts a system in an example implementation showing operation of an analytics onboarding system of FIG. 1 in greater detail as onboarding web content.
Figure 3:
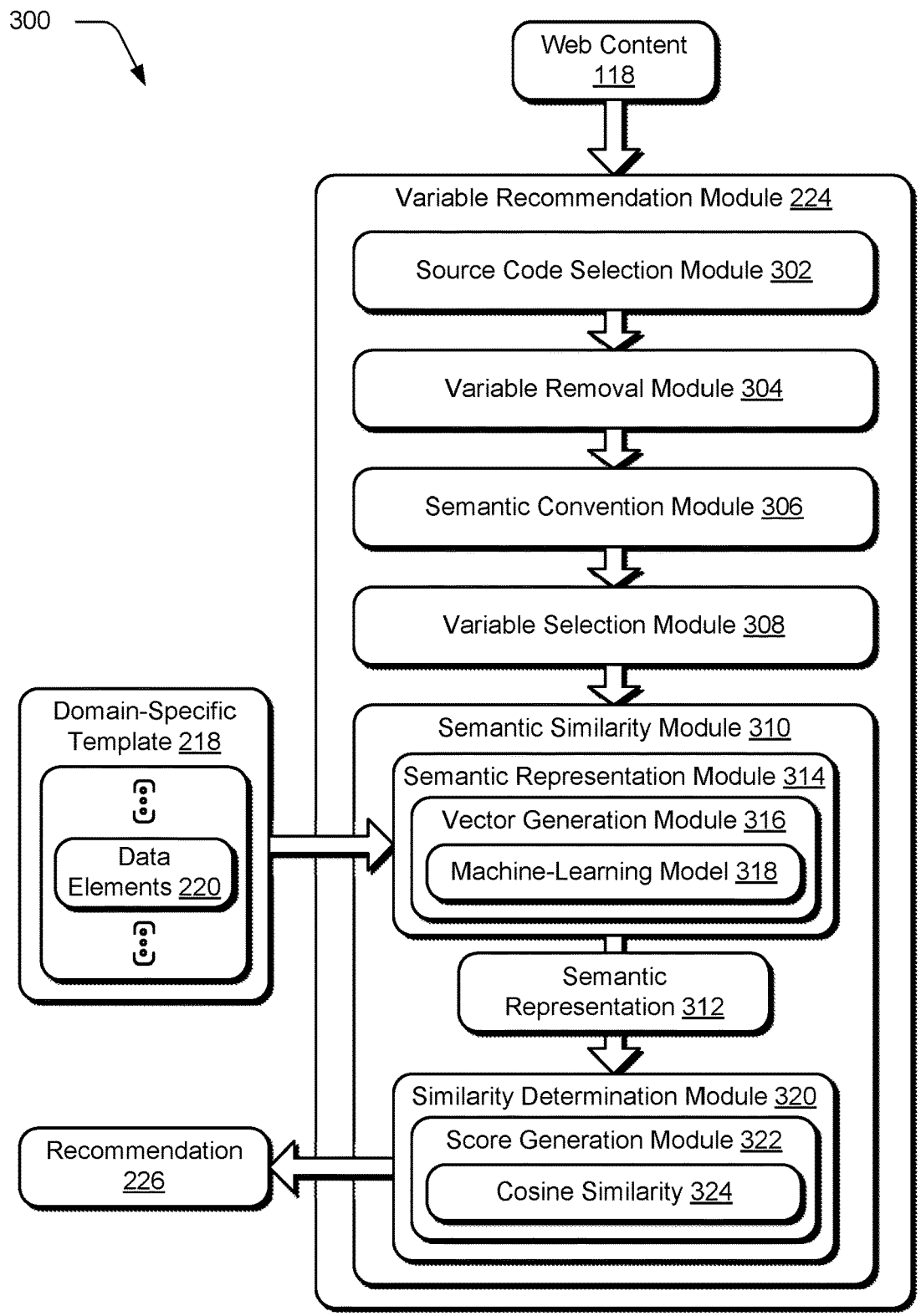
FIG. 3 depicts a system in an example implementation showing operation of a variable recommendation module of FIG. 2 as generating a recommendation of a data element to be mapped to a web content variable.
Figure 4:
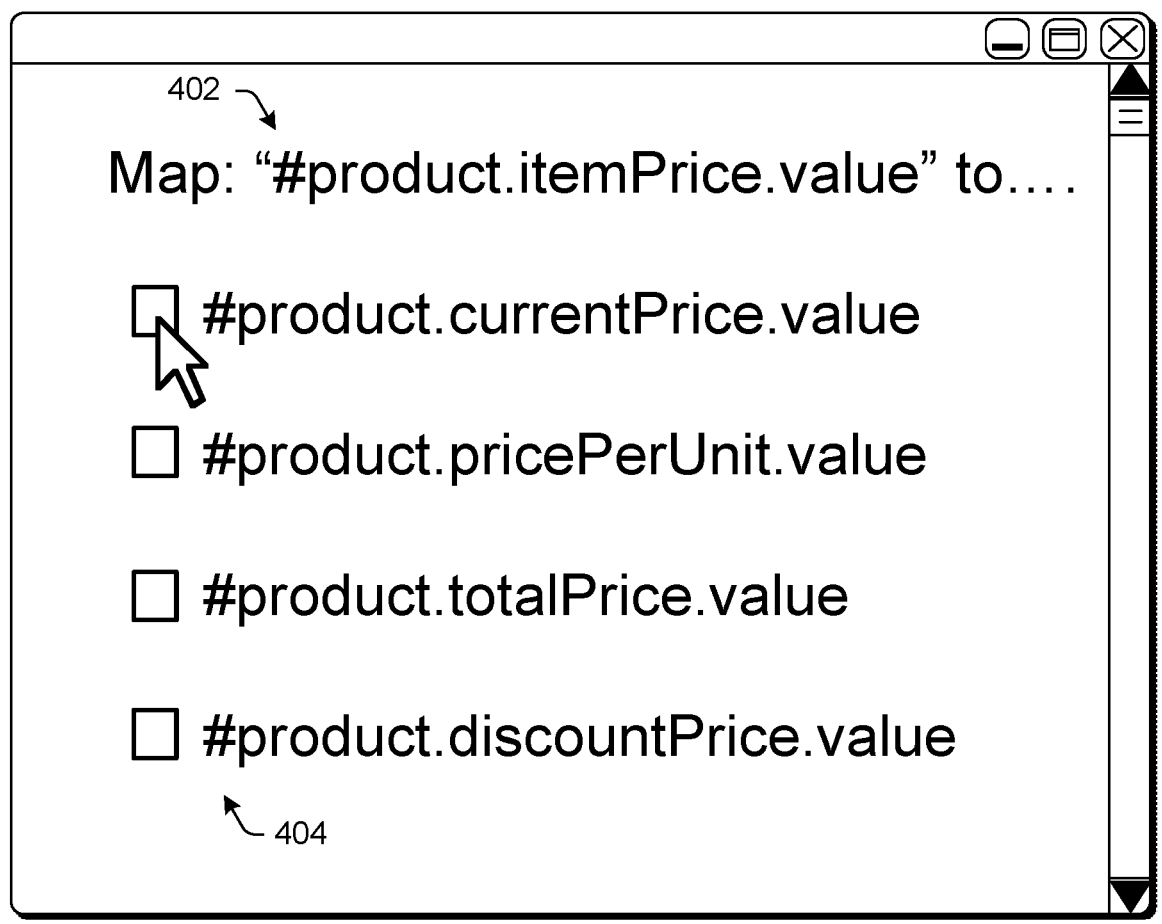
FIG. 4 depicts an example of a user interface output to accept user inputs to map a web content variable to a respective data element of a plurality of data elements included in the recommendation of FIG. 3.
Figure 5:
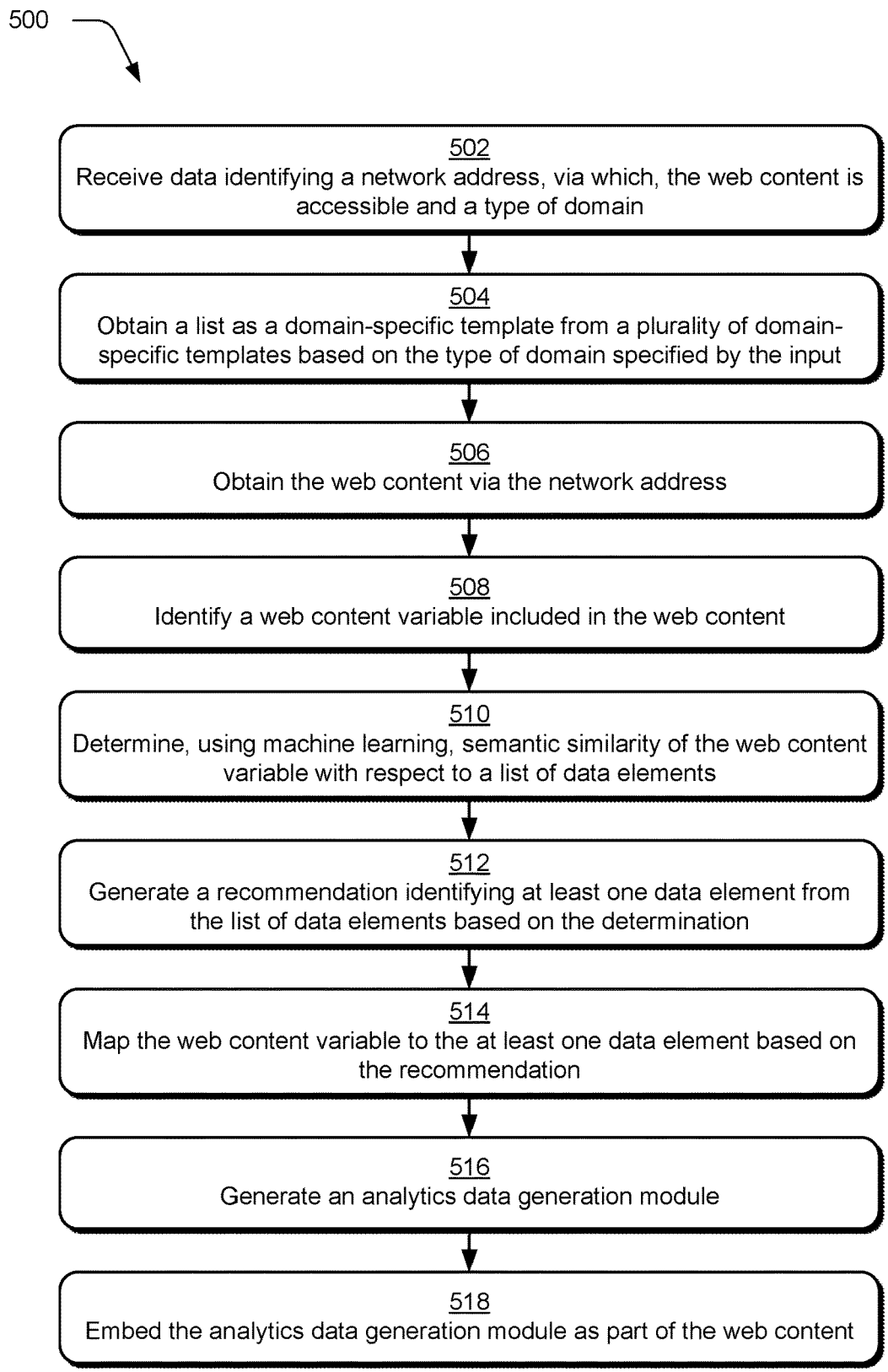
FIG. 5 is a flow diagram depicting a procedure in an example implementation of generating an analytics data generation module to communicate analytics data describing user interaction with web content.
Figure 6:
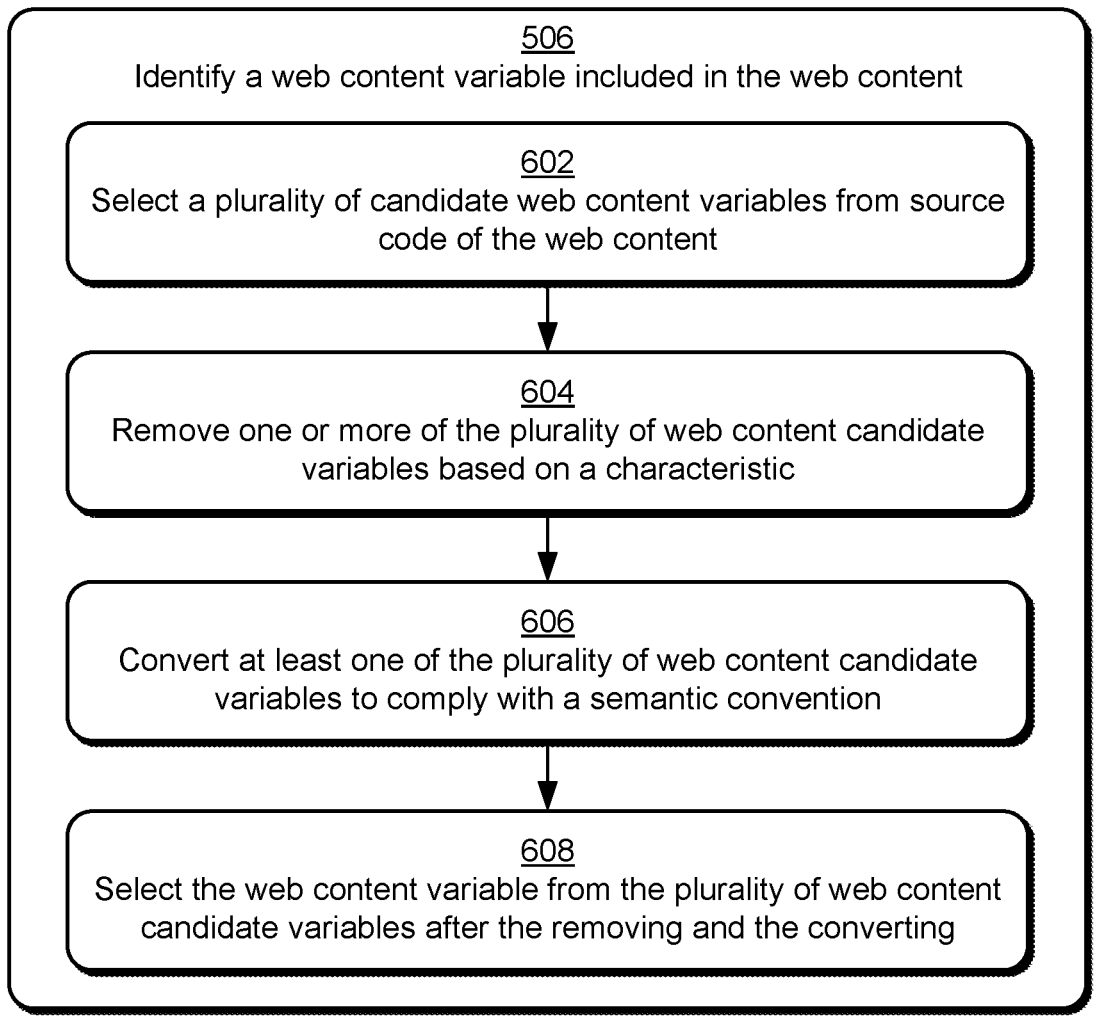
FIG. 6 is a flow diagram depicting a procedure in an example implementation of processing web content to select web content variables to be used as a basis for generating a recommendation of FIG. 5.

FIG. 2 depicts a system 200 in an example implementation showing operation of the analytics onboarding system 140 of FIG. 1 in greater detail as onboarding web content 118 for operation with an analytics system 102. FIG. 3 depicts a system 300 in an example implementation showing operation of a variable recommendation module of FIG. 2 as generating a recommendation of a data element to be mapped to a web content variable. FIG. 4 depicts an example of a user interface 400 output to accept user inputs to map a web content variable to a respective data element of a plurality of data elements included in the recommendation of FIG. 3. FIG. 5 depicts a procedure 500 in an example implementation of generating an analytics data generation module to communicate analytics data describing user interaction with web content. FIG. 6 depicts a procedure 600 of processing web content to select web content variables to be used as a basis for generating a recommendation of FIG. 5. FIG. 7 depicts a procedure 700 in an example implementation of determining semantic similarity, using machine learning, of the web content variable to data elements supported by the analytics system 102 as a basis to generate the recommendation.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

To begin in this example, data is received identifying a type of domain and a network address, via which, web content is accessible (block 502). The analytics onboarding system 140, for instance, may include a user input module 202 that is configured to expose a user interface 204, via which, a user input 206 is received to generate identifying data 208. The user interface 204, for instance, may be exposed locally at the analytics system 102 or remotely via the network 110.

The identifying data 208 in the illustrated instance identifies a network address 210 and a domain type 212 and is passed from the user input module 202 to a data element generation module 214. The data element generation module 214 uses the identification of the domain type 212 by a smart engine to obtain a list is as a domain-specific template 218 selected from a plurality of domain-specific templates 216 (stored in a storage device) based on the type of domain specified by the input (block 504). The smart engine, for instance, may support natural language processing to determine corresponding with text expressed by the domain type 212 with text identifying the corresponding templates.

The domain-specific templates 216 specify data elements 220 and rules 222 that are particular to different types of domains, such as ecommerce domains, content streaming domains, storage domains, communication domains (e.g., instant messaging, email, digital image sharing), and so forth. The data elements 220 and rules 222, for instance, may correspond to metrics and actions performed as part of ecommerce and the data elements 220 and rules 222 used to generate analytics data 114 that supports these metrics and actions.

For an ecommerce website, for instance, actions may include adding an item to a shopping cart, applying a coupon, use of "buy now," removing an item from the shopping cart, and so forth. For web content dissemination systems (e.g., music and/or video streaming services), actions may include initiating streaming of web content, web content searches, and so on. The data elements 220 are variables supported by the analytics system 102 that are tracked for each event, e.g., to generate metrics regarding the event. The rules 222 specify "when" the analytics data 114 is generated and reported, e.g., when the event is triggered. For an event involving a purchase made using a shopping care for instance, data elements 220 may include a seller's name, product name, product ID, price, delivery time, product characteristics, user demographics, and so forth. The rules specify when the analytics data 114 is generated in this example, e.g., "add to cart," "purchase," or other event. Metrics may then be generated by the analytics system 102 based on these data elements 220, such as an average cost per product sold in a particular hour, computational resources utilized over a holiday weekend, and so forth. In this way, the domain-specific templates may be used to increase efficiency by specifying variables that are of interest for particular domains, and avoid processing of those that are not, e.g., ecommerce versus streaming platform.

As described above, the identifying data 208 received via the user input module 202 also identifies a network address, via which, the web content 118 is available. Accordingly, the variable recommendation module 224 is configured to obtain the web content 118 (block 506) from the network address in this example, e.g., a uniform resource locator (URL). Other examples are also contemplated, such as to receive the web content 118 via an upload, as an attachment to a communication (e.g., email), and so forth.

The web content 118, once obtained, is then processed by the variable recommendation module 224 to generate a recommendation 226 identifying one or more data elements supported by the analytics system 102 (and more particularly the analytics data collection system 128) that correspond to web content variables of the web content 118, respectively. To do so in one example, a web content variable included in the web content is first identified by the variable recommendation module 224 (block 508) that is to serve as a basis for generating the recommendation 226. This variable may be identified by the variable recommendation module 224 in a variety of ways.

As shown in an example system 300 of FIG. 3, for instance, the web content 118 is obtained by the variable recommendation module 224. A plurality of candidate web content variables is then selected from source code of the web content (block 602) by a source code selection module 302. The source code selection module 302, for instance, may parse source code of the web content 118 and select portions that pertain to data analytics processing, e.g., object oriented computing language variables (e.g., JavaScript® variables), hypertext markup language (HTML) metatags, input tags, div text or div IDs (e.g., defining a division or section in an HTML document), cascading style sheet (CSS) selectors, and so forth. Portions of the source code that do not pertain to data analytics processing are discarded by the source code selection module 302.

The portions of the source code of the web content 118 that remain are then further processed to improve data processing performance and increase efficiency in generating the recommendation 226 by the variable recommendation module 224. For example, a variable removal module 304 may be employed to remove candidate web content variables based on one or more defined characteristics (block 604). The variable removal module 304, for instance, may "prune" candidate web content variables from the remaining source code that include over 100 characters, may "flatten" container structures (e.g., JSON structures) to obtain the candidate web content variables contained therein, and so on based on a variety of different characteristics. In this way, the variable removal module 304 may reduce an amount of data being further processed (i.e., the amount of candidate web content variables) and increase accuracy by exposing web content variables located in containers, remove web content variables that are unlikely to correspond to data elements supported by the analytics system 102 (e.g., over 100 characters), and so forth.

The variable recommendation module 224 also includes a semantic convention module 306 that is configured to convert the candidate web content variables to comply with a semantic convention (block 606). The semantic convention module 306, for instance, may be configured to follow one or more semantic conventions involving use of underscores, hyphens, camel cases (e.g., use of an initial capital for the first letter of a word forming a second element of a closed compound such as InDesign®), and so forth. Accordingly, the semantic convention module 306 may convert one or more of the candidate web content variables to comply with this convention, e.g., remove underscores, camel cases, and so forth. This promotes consistency with data elements supported by the analytics system 102 as part of the determination of semantic similarity as further detailed below.

A web content variable is then selected by a variable selection module 308 from the candidate web content variables after the removing and the converting (block 608) to determine which data element supported by the analytics system 102 corresponds to the web content variable. The variable selection module 308, for instance, may maintain a queue of candidate web content variables that remain after the removal and are converted, if appropriate. The queue, for instance, may be maintained based on an ordering within source code of the web content 118. The web content variable is then selected from this queue and further processed to generate a recommendation 226.

The selected web content variable, for instance, is passed from the variable selection module 308 to a semantic similarity module 310 of the variable recommendation module 224. A determination is then made, using machine learning, of semantic similarity of the web content variable with respect to a list of data elements (block 510). As described above, the data elements involve metrics supported by the analytics system 102 to track user interaction with web content 118.

To do so, a semantic representation 312 is generated by a semantic representation module 314 of the web content variable (block 702) selected by the variable selection module 308. The semantic representation 312, for instance, may be generated as a vector by a vector generation module 316 that employs a machine-learning model 318. The machine-learning model 318, for instance, may be trained using a corpus of text to reconstruct linguistic context of text included in the corpus. A vector space generated as part of this training and implemented by the machine-learning model 318 may then be used to determine semantic similarity of concepts reflected by vectors generated by the machine-learning model 318. An example of machine-learning models 318 trained to generate vectors and implement such a vector space is referred to as "word2vec" which is a group of related models implemented as two-layer neural networks. Other examples are also contemplated.

The semantic representation 312 generated for the web content variable is passed from the semantic representation module 314 to a similarity determination module 320. The similarity determination module 320 is representative of functionality to determine an amount of similarity of the semantic representation 312 generated for the web content variable to data elements 220 in the list, e.g., the domain-specific template 218. The semantic representation module 314, for instance, may also generate semantic representations (e.g., vectors) of the data elements 220 included in the domain-specific template 218. This may be performed in real time in response to selection of the domain-specific template 218 by the data element generation module 214 or "offline" beforehand, e.g., to improve performance. The data elements 220 of the domain-specific template 218, for instance, may also include semantic representations that were previously generated by the model and stored in the storage device 216.

The similarity determination module 320 then employs a score generation module 322 which is configured to generate a similarity score for the semantic representation 312 with respect to semantic representations of data elements 220 in the list of data elements (block 704) from the domain-specific template 218. The score generation module 322, for instance, may employ a similarity function such as Cosine similarity 324 to compare the vector included in the semantic representation 312 of the web content variable to respective vectors of semantic representations of the data elements 220.

Cosine similarity 324 measures a cosine of an angle between two non-zero vectors of an inner product space (i.e., the vector space) implemented by the machine-learning model 318. Closeness of the vectors within this vector space (e.g., based on the angle) specifies an amount of similarity of the vectors, and therefore the corresponding semantic representations to each other. Thus, the similarity score based on this angle (and thus an amount of "closeness" within the vector space) defines an amount of similarity of the web content variable to respective data elements 220 and is performed automatically and without user intervention in this example.

A recommendation 226 is generated by the similarity determination module 320 by identifying at least one data element from the list of data elements 220 based on the determination (block 512), i.e., based on the similarity scores. The similarity determination module 320, for instance, may generate the recommendation 226 by selecting a threshold number of data elements that are the closest, data elements having a similarity score over a threshold amount, and so on based on respective similarity scores.

The recommendation 226 is then passed from the variable recommendation module 224 to a mapping module 228. The mapping module 228 is configured to map the web content variable to a data element based on the recommendation (block 514). The mapping module 228, for instance, may be configured to output a user interface 232, via which, a user input 234 is received to indicate a correct mapping between the web content variable and a data element of the plurality of data elements 220.

An example user interface 400 as output by the mapping module 228 is illustrated in FIG. 4. The user interface 400 includes a representation 402 of the web content variable. The representation 402, for instance, may be taken from source code of the web content 118, directly, may be a "cleaned" version (e.g., as processed by the semantic convention module 306), and so forth.

The user interface 400 also includes representations 404 of data elements 220 included in the recommendation 226. The recommendation 226, for instance, may include a ranked listing of data elements 220 based on similarity score. The representations 404 are user selectable (e.g., via check box as illustrated but other techniques are also contemplated such as gesture, spoken utterance, and so forth) to indicate which data element corresponds to the web content variable. Thus, the recommendations may act to guide a user to data elements that are semantically similar to web content variables included in the web content 118.

In this way, a user may interact with the mapping module 228 to map web content variables to corresponding data elements for thousands and tens of thousands of web content variables in an efficient and intuitive matter, e.g., in a manner of hours as opposed to months by a team of data scientists as required in conventional techniques. Further, the mapping module 228 may be configured to "remember" past choices such that these choices are not repeated, thereby further improving efficiency in operation of the computing device and user interaction with the device. Other examples are also contemplated in which the mapping is performed automatically and without user intervention. For example, the mapping module 228 may select the data element automatically and without user intervention that has the highest similarity score, is above a threshold amount, and so forth.

Mapping data 230 generated by the mapping module 228 that indicates correspondence of web content variables in the web content 118 to respective data elements 220 is passed from the mapping module 228 to a model generation engine 236. The model generation engine 236 is configured to generate the analytics data generation module 138 (block 516), which may be performed automatically and without user intervention based on the mapping data 230. As previously described, the domain-specific template 218 includes data elements 220 and rules 222 specifying how those data elements are to be used to generate analytics data 114.

For example, the module generation engine 236 may "fill in" the domain-specific template 218 to generate executable code of the analytics data generation module 138 based on the mapping. The analytics data generation module 138, for instance, may be configured as a "tag" or "pixel" as a snippet of executable code, e.g., an object-oriented language such as JavaScript®. The analytics data generation module 138 may then be embedded as part of the web content 118 (block 518) to collect and communicate analytics data 114 to the analytics system 102 as part of monitored user 124 interaction with the web content 118. The analytics data 114 generated as part of the monitored execution may then be used for a variety of purposes, such as to control hardware/software provisioning, control dissemination of digital content 132 for consumption with the web content 118, and so on. In this way, the techniques and systems overcome the challenges and inefficiencies of conventional onboarding techniques.

Example System and Device

Figure 8:
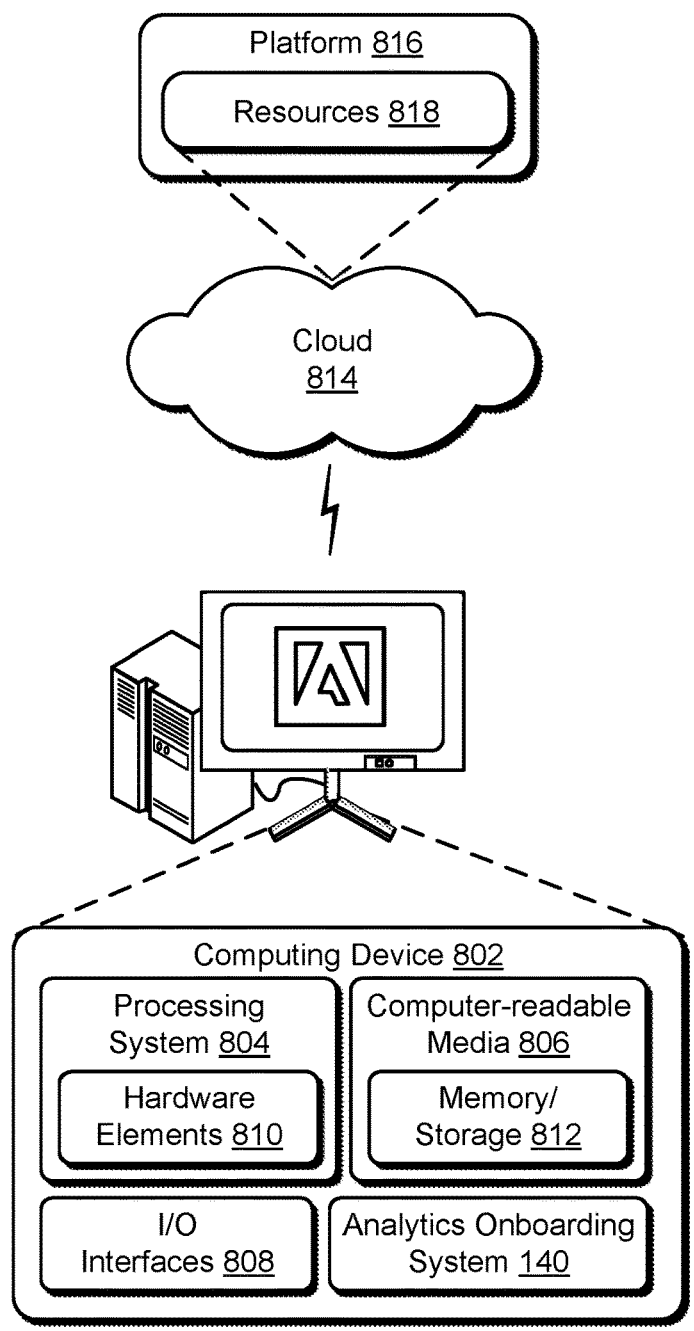
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the analytics onboarding system 140. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium analytics environment, a method of onboarding web content by at least one computing device, the method comprising:
identifying, by the at least one computing device, a web content variable included in web content by flattening a container structure to expose the web content variable in source code of the web content;
converting, by the at least one computing device using semantic analysis, the web content variable based on a semantic convention of web content variables in a queue of web content variables that is maintained based on an ordering within the source code of the web content;
determining, by the at least one computing device using machine learning, semantic similarity of the web content variable with respect to a list of data elements of a domain-specific template by generating semantic representations of data elements in the list of data elements, the data elements involving metrics supported by an analytics system in a domain of the web content;
generating, by the at least one computing device, a recommendation identifying at least one data element from the data elements based on the determining;
mapping, by the at least one computing device, the web content variable to the at least one data element based on the recommendation; and
generating, by the at least one computing device, an analytics data generation module based on the mapping, the analytics data generation module configured to be embedded within the web content to generate analytics data based on rules specified by the domain-specific template for receipt by the analytics system via a network to track web content user interaction.

2. The method as described in claim 1, further comprising receiving, by the at least one computing device, data identifying a network address, via which, the web content is accessible and obtaining the web content from the network address.

3. The method as described in claim 1, further comprising obtaining, by the at least one computing device, the domain-specific template from a plurality of domain-specific templates based on the domain of the web content.

4. The method as described in claim 1, wherein the mapping includes:
outputting an indication of the web content variable and the at least one data element for display in a user interface based on the recommendation; and
receiving a user input, entered via the user interface, indicating that the web content variable corresponds to the at least one data element.

5. The method as described in claim 4, wherein the recommendation includes a plurality of the data elements and the user input selects the at least one data element from the plurality of the data elements via the user interface.

6. The method as described in claim 1, wherein the determining includes:
generating a semantic representation of the web content variable; and
generating a similarity score for the semantic representation with respect to the semantic representations of the data elements.

7. The method as described in claim 6, wherein the similarity score defines how close a vector of the semantic representation of the web content variable is to respective vectors of the semantic representations of the data elements in a vector space implemented by a model trained using machine learning.

8. The method as described in claim 7, wherein the similarity score is based on cosine similarity.

9. The method as described in claim 1, further comprising embedding the analytics data generation module as part of the web content.

10. The method as described in claim 1, wherein the identifying includes:
selecting a plurality of candidate web content variables from the source code of the web content;
removing one or more of the plurality of candidate web content variables based on a characteristic;
converting a candidate web content variable of the plurality of candidate web content variables to follow the semantic convention; and
selecting the web content variable from the plurality of candidate web content variables after the removing and the converting.

11. The method as described in claim 10, wherein:
the removing is based on the characteristic as including length or structure; and
the converting the candidate web content variable includes converting the candidate web content variable to have use of underscores, hyphens, or camel cases that is consistent with the semantic convention.

12. In a digital medium analytics variable recommendation environment, a system comprising:
a variable selection module implemented by a computing device to:
identify a web content variable included within web content by flattening a container structure to expose the web content variable in source code of the web content, the web content variable describing an event involving user interaction with the web content; and
convert, using semantic analysis, the web content variable based on a semantic convention of web content variables in a queue of web content variables that is maintained based on an ordering within the source code of the web content;
a semantic similarity module implemented by the computing device to generate a recommendation as to which data element of data elements in a list of data elements of a domain-specific template corresponds to the web content variable, the data elements involving metrics supported by an analytics system in a domain of the web content, the semantic similarity module including:
a semantic representation module to generate a semantic representation of the web content variable and semantic representations of the data elements using a model trained using machine learning; and
a similarity determination module to:
generate similarity scores by comparing the semantic representation of the web content variable to the semantic representations, of the data elements; and
generate the recommendation based on the similarity scores;
a mapping module implemented by the computing device to map at least one data element of the data elements to the web content variable based on the recommendation; and a module generation engine implemented by the computing device to generate an analytics data generation module based on the mapping, the analytics data generation module configured to be embedded within the web content to generate analytics data based on rules specified by the domain-specific template for receipt by the analytics system via a network to track web content user interaction.

13. The system as described in claim 12, wherein the similarity scores define how close a vector of the semantic representation of the web content variable is to respective vectors of the semantic representations of the data elements in a vector space implemented by the model trained using machine learning.

14. The system as described in claim 13, wherein the similarity scores are based on cosine similarity.

15. The system as described in claim 12, wherein the mapping module is configured to:
output an indication of the web content variable and the at least one data element for display in a user interface based on the recommendation; and
receiving a user input, entered via the user interface, indicating that the web content variable corresponds to the at least one data element.

16. The system as described in claim 15, wherein the recommendation includes a plurality of the data elements and the user input selects the at least one data element from the plurality of the data elements via the user interface.

17. A non-transitory computer-readable storage medium storing executable instructions, which when executed by a processing device, cause the processing device to perform operations comprising:
identifying a web content variable included in web content by flattening a container structure to expose the web content variable in source code of the web content;
converting, using semantic analysis, the web content variable based on a semantic convention of web content variables in a queue of web content variables that is maintained based on an ordering within the source code of the web content;
determining, using machine learning, semantic similarity of the web content variable with respect to a list of data elements of a domain-specific template by generating semantic representations of data elements in the list of data elements, the data elements involving metrics supported by an analytics system in a domain of the web content;
generating a recommendation identifying at least one data element from the data elements based on the determining;
mapping the web content variable to the at least one data element based on the recommendation; and
generating an analytics data generation module based on the mapping, the analytics data generation module configured to be embedded within the web content to generate analytics data based on rules specified by the domain-specific template for receipt by the analytics system via a network to track web content user interaction.

18. The non-transitory computer-readable storage medium as described in claim 17, wherein the operations further comprise:
generating a semantic representation of the web content variable; and
generating a similarity score for the semantic representation with respect to the semantic representations of the data elements.

19. The non-transitory computer-readable storage medium as described in claim 18, wherein the similarity score is based on cosine similarity.

20. The non-transitory computer-readable storage medium as described in claim 17, wherein the web content variable is identified after removing an additional web content variable from the source code of the web content.

* * * * *